United States Patent
Wheeler

[11] 3,949,269
[45] Apr. 6, 1976

[54] RASTER DISTORTION CORRECTION CIRCUITRY

[75] Inventor: Robert Charles Wheeler, Genesee, N.Y.

[73] Assignee: GTE Sylvania Incorporated, Stamford, Conn.

[22] Filed: Sept. 6, 1974

[21] Appl. No.: 503,675

[52] U.S. Cl. ............................ 315/371; 315/370
[51] Int. Cl.² ................................... H01J 29/70
[58] Field of Search ........... 315/371, 370, 399, 403, 315/407

[56] References Cited
UNITED STATES PATENTS

| | | | |
|---|---|---|---|
| 3,452,243 | 6/1969 | Knorr | 315/371 |
| 3,676,733 | 7/1972 | Eulenberg et al. | 315/371 |

*Primary Examiner*—Malcolm F. Hubler
*Attorney, Agent, or Firm*—Norman J. O'Malley; Thomas H. Buffton; Robert T. Orner

[57] ABSTRACT

Raster and particularly top and bottom pincushion distortion in a cathode ray tube system is corrected by applying a drive signal from the vertical output system of a television receiver to the vertical deflection winding of a yoke to effect activation of switching elements whereby correction signals of the proper phase and amplitude and derived from the horizontal scan system are applied to the vertical deflection winding such that a vertical deflection potential at a frequency $fv$ is modulated by a horizontal deflection potential at a frequency $fh$ and of the correct phase and magnitude.

14 Claims, 4 Drawing Figures

RASTER DISTORTION CORRECTION CIRCUITRY

BACKGROUND OF THE INVENTION

This invention relates to raster distortion correction circuitry and more particularly, to top and bottom pincushion distortion correction circuitry.

Ordinarily, television receivers have a cathode ray tube with a deflection yoke affixed thereto. Horizontal and vertical deflection circuitry in conjunction with the deflection yoke provide a varying electromagnetic field whereby the electron beam of the cathode ray tube is deflected to provide a raster. This raster is preferably rectangular in shape but, unfortunately, various types of electron beam distortion cause the raster to deviate from the desired rectangular configuration.

A well-known form of raster distortion is known as pincushion distortion, and more particularly, top and bottom pin-cushion distortion. Herein, the horizontal scan lines forming the raster tend to have a maximum deviation or bowing intermediate or central of the ends of a horizontal scan line. Also, the deviation of bowing varies from a minimum at the vertical center of the raster to a maximum at the top and bottom of the raster. Moreover, the distortion or bowing of the scan lines is downwardly from the top of the raster and upwardly from the bottom toward the center of the raster.

Known arrangements for correcting the above-described top and bottom pincushion distortion includes alteration of a current varying at the vertical frequency $fv$ by a current varying at the horizontal frequency $fh$. This alteration of the vertical current $fv$ by the horizontal current $fh$ must occur at the phase and magnitude such that the undesired distortion or bowing of the horizontal scan lines, is in effect, cancelled.

One known form of apparatus for effecting correction of the above-described top and bottom pincushion distortion is disclosed in U.S. Pat. No. 3,463,961 issued to C. B. Neal et al. on Aug. 26, 1969. Therein, a pair of amplifying devices are connected in push-pull with a signal at field scanning frequency $fv$ and opposite phases applied to the amplifiers. Also, a signal at the horizontal scan frequency $fh$ is coupled to each of the amplifiers. The output from the amplifiers is coupled to the vertical deflection winding of a yoke associated with a cathode ray tube wherein the desired pincushion correction is effected.

Another known form of apparatus for effecting top and bottom pincushion correction utilizes a saturable reactor whereby an appropriately modulated horizontal frequency component is introduced into the vertical scanning path. Factually, a wave component varying at both horizontal and vertical deflection frequencies is produced and added to a vertical deflection wave for impression upon the vertical windings of a deflection yoke. In this manner, the top and bottom deviations in the horizontal scan lines are corrected and a substantially rectangular-shaped raster is effected.

Although the above-mentioned techniques have been employed in numerous television receiver designs with a great deal of success, it has been found that such techniques do leave something to be desired. For example, multiple amplifying devices are expensive and subject to deterioration and replacement. Saturable reactors are also expensive, subject to thermal runaway and failure, and tend to radiate considerable stray and undesired electric and magnetic fields. Moreover, saturable reactors are difficult to design and adopt to specific chassis and even more difficult to employ where independent and differing amounts of top and bottom correction is desired.

OBJECTS AND SUMMARY OF THE INVENTION

An object of the present invention is to provide enhanced top and bottom pincushion correction circuitry for a television receiver. Another object of the invention is to provide apparatus for modulating a vertical deflection potential at a frequency $fv$ with a horizontal deflection potential at a frequency $fh$. Still another object of the invention is to provide switching elements responsive to a drive signal from a vertical deflection system for effecting application of correction signals from the horizontal scan system to the vertical deflection winding of a deflection yoke associated with a cathode ray tube. A further object of the invention is to provide improved apparatus for independently controlling top and bottom pincushion correction in both amplitude and phase without producing undesired stray electric and magnetic fields and utilizing inexpensive components in simple circuitry.

These and other objects, advantages and capabilities are achieved in one aspect of the invention by raster distortion correction circuitry wherein a vertical deflection winding associated with a cathode ray tube is coupled to a drive source at a vertical scan frequency $fv$ and shunted by a reactance means and one of a pair of series connected impedance and oppositely-poled switching means connected to a signal source at the horizontal scan frequency $fh$ to provide a parallel resonant circuit at the horizontal scan frequency $fh$.

PREFERRED EMBODIMENT OF THE INVENTION

For a better understanding of the present invention, together with other and further objects, advantages and capabilities thereof, reference is made to the following disclosure and appended claims in connection with the accompanying drawings.

Figure 1:
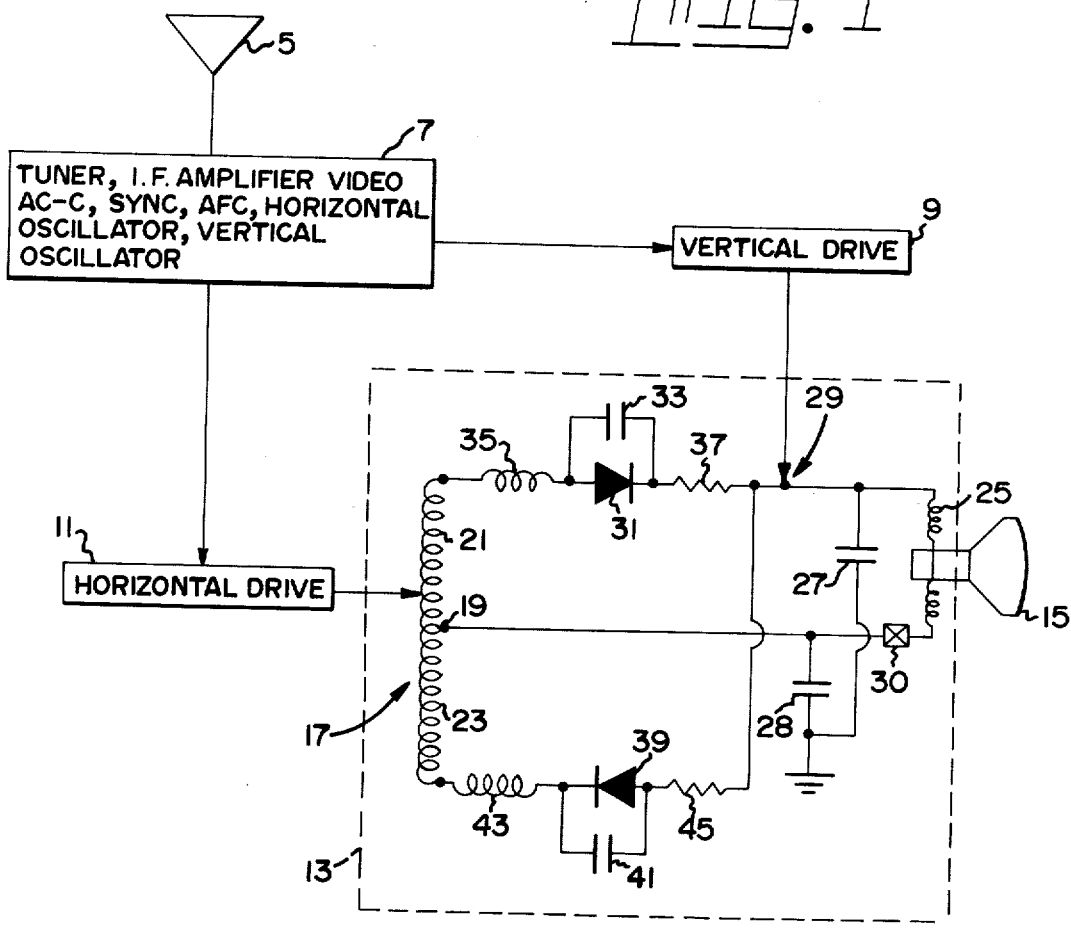
FIG. 1 is an illustration, in block and schematic form, of a television receiver employing a preferred embodiment of the invention.

Referring to FIG. 1 of the drawings, a typical television receiver includes an antenna 5, for intercepting transmitted television signals, coupled to a signal receiver 7. The signal receiver 7 includes the usual tuner, intermediate and video frequency amplifier and detector stages, automatic gain control (AGC), automatic frequency control (AFC), sync separator, and horizontal and vertical frequency oscillator stages.

One output of the signal receiver 7 is applied to a vertical drive circuit 9. This drive circuit 9 is a high impedance source for horizontal frequencies. This may be a constant current source which is normally a high impedance source or a constant voltage source which may then require an output choke coil to raise its output impedance at horizontal frequencies. Another output of the signal receiver 7 is applied to a horizontal drive circuit 11. In turn, the vertical drive circuit 9 and the horizontal drive circuit 11 are coupled to a raster distortion correction circuit means 13 associated with a cathode ray tube 15.

The raster distortion correction circuit means 13 has a flyback transformer winding 17 with a tap 19 and first and second winding portions 21 and 23 respectively. The flyback transformer winding 17 is coupled to the horizontal drive circuit 11 and serves as a source of signals at the horizontal scan frequency $fh$.

A vertical deflection winding 25, in series with a coupling capacitor 28 associated with the cathode ray tube 15, is shunted by a phasing capacitor 27 to form part of a parallel resonant circuit 29 tuned to the horizontal scan frequency $fh$. This portion of the parallel resonant circuit 29 is coupled to the vertical drive circuit 9 which, for example, may serve as a current source for signals at a frequency $fv$. Moreover, quadrupole winding and convergence circuitry 30 may be, but not necessarily need be, disposed between the tap 19 of the transformer winding 17 and the vertical deflection winding 25.

Also, a first switching means in the form of a diode 31 is shunted by a capacitor 33 and in series connection with a first impedance 35, first resistance 37, and first portion 21 of the transformer winding 17. A second switching means in the form of a diode 39, oppositely-poled to the diode 31, is shunted by a capacitor 41 and in series connection with a second impedance 43, a second resistance 45, and the second portion 23 of the transformer winding 17. The tap 19 of the transformer winding 17 is connected to the junction of the vertical deflection winding 25 and the coupling capacitor 28 which is essentially a short circuit for frequencies of interest.

Thus, activation of the first switching means, in the form of the diode 31, serves to switch the first impedance 35, first resistance 37, and first portion 21 of the transformer winding 17 in parallel with the phasing capacitor 27 and vertical deflection winding 25 and coupling capacitor 28 combination. Similarily, activation of the second switching means, in the form of the diode 39, serves to switch the second impedance 43, second resistance 45, and second portion 23 to the transformer winding 17 in parallel with the phasing capacitor 27 and vertical deflection winding 25 and coupling capacitor 28 combination.

Figure 2:
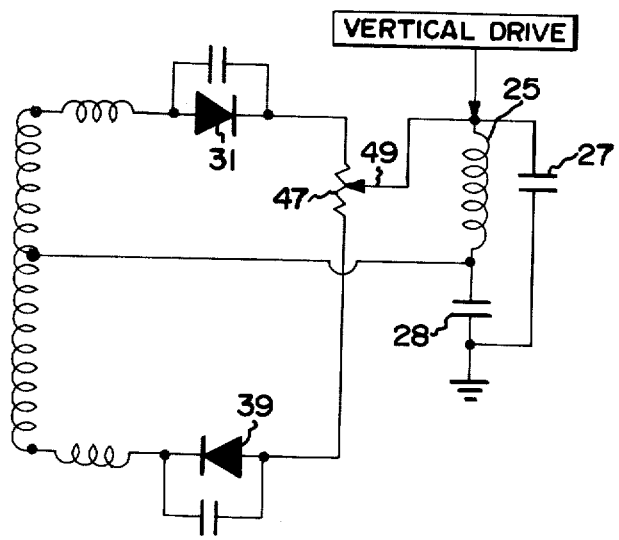
FIGS. 2 and 3 are alternative embodiments of the invention as illustrated in FIG. 1.

Alternatively, FIG. 2 illustrates an embodiment of the raster distortion correction circuit means 13 wherein an adjustable resistor 47 is coupled to the oppositely-poled diodes 31 and 39. The alterable arm 49 of the adjustable resistor 47 is connected to the junction of the vertical deflection winding 25 and vertical drive circuit 9. Thus, the ratio of top to bottom pincushion correction may be varied in a manner similar to the well-known "balance" control systems.

Figure 3:
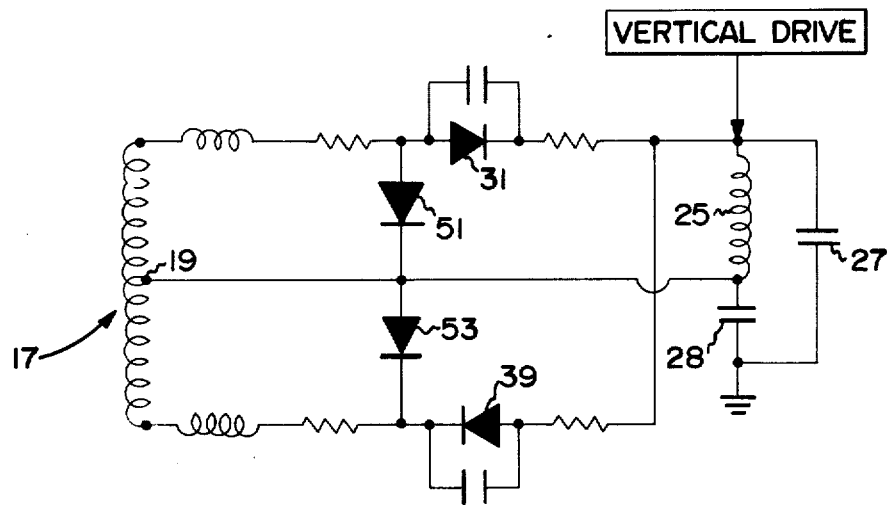

FIG. 3 illustrates still another embodiment of a raster distortion correction circuit means 13. Herein, a clamping diode 51 is connected between the tap 19 of the flyback transformer winding 17 and the first switching means or diode 31. An oppositely-poled diode 53 is connected to the tap 19 of the flyback transformer winding 17 and to the second switching means or diode 39. Thus, the added clamping diodes 51 and 53 serve to reference the baselines of the pulse signals available from the flyback transformer winding 17 to a substantially zero potential level across the vertical deflection winding 25. In this manner, any undesired signal overlap which would normally appear at or near the point of zero potential across the vertical deflection winding 25 is eliminated or cancelled.

As to operation, it may be noted that a first portion of the circuitry, including a first portion 21 of the transformer winding 17, diode 31, inductor 35, resistor 37, and the remainder of the parallel resonant circuit 29 serve to provide correction of one-half the scanning raster, i.e., top pincushion distortion correction. A second portion of the circuitry, including the second portion 23 of the transformer winding 17, diode 39, inductor 43, resistor 45, and the remainder of the above-mentioned parallel resonant circuit 29 provide bottom pincushion distortion correction. Thus, discussion of one portion of the circuitry, the one effecting top pincushion distortion correction, would appear to suffice for explaining the operational capabilities of the circuitry.

Figure 4:
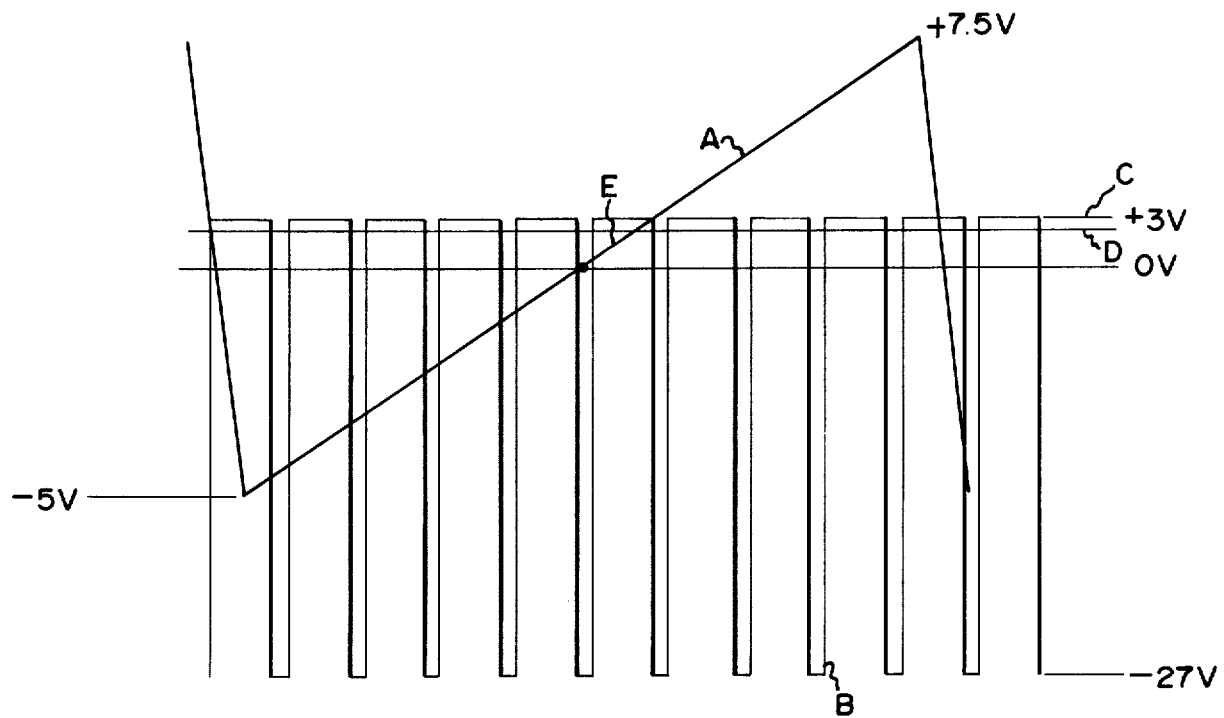
FIG. 4 is a graphic illustration of the signals employed for top pincushion distortion correction.

Referring to the graphic illustration of FIG. 4, a vertical sawtooth-shaped voltage waveform "A" available from the vertical drive source 9 of FIG. 1, and applied to the parallel resonant circuit 29 of FIG. 1, may have a value in the vicinity of about $\mp 7.5$ volts for example. Moreover, the a.c. axis of the sawtooth-shaped waveform "A" is at the well known zero voltage level, "Ov".

Also, a flyback pulse signal "B", greatly scaled down in frequency and magnitude to simplify the illustration, is available from the first portion 21 of the flyback transformer winding 17 and applied to the parallel resonant circuit 29. Generally, the flyback pulse signal "B" in modern day television receivers is of a frequency and magnitude such that the baseline and about 10% of the pulse magnitude is above the a.c. axis with about 90% of the flyback pulse signal "B" appearing below the a.c. axis. Assuming a pulse signal "B" in the range of about 30 volts p-p, for example, the baseline "D" occurs at about +3 volts with the peaks of the pulse signal "B" about −27 volts. The a.c. axis of the flyback pulse signal "B" is coincident with and at the 0-volts axis due to the coupling of the tap 19 of the flyback transformer winding 17 to one end of the vertical deflection winding 25.

When the vertical voltage having a sawtooth-shaped waveform "A" at a frequency $fv$ appearing across the vertical deflection winding 25 and applied to the cathode of the diode 31 falls about 0.5 volts or to a value less than about 2.5 volts, the diode 31 becomes conductive. Thereupon, current pulses from the first portion 21 of the flyback transformer winding 17 are applied to the vertical delfection winding 25 shunted by the phasing capacitor 27 via the diode 31, inductor 35, and resistor 37. These current pulses will cause development of a sinusoidaltype voltage across the parallel resonant circuit 29 having an amplitude proportional to the voltage drop across the deflection winding 25.

As can be seen in the illustration of FIG. 4, a decrease from about 3.0 volts "C" to about 2.5 volts "D" in the voltage applied to the vertical deflection winding 25 from the vertical drive circuit 9 causes conduction of the diode 31. The vertical sawtooth-shaped waveform "A" at a frequency $fv$ and the flyback pulse signal "B" are both at a maximum value at the beginning of the vertical sweep cycle and progressively decrease as the vertical sweep advances toward the center of the cathode ray tube. Moreover, the flyback pulse current signals at a frequency $fh$ are proportional to the potential across the series connected diode 31, inductor 35, and resistor 37 and cause development of a sinusoidal waveform across the parallel-resonant circuit 29.

It can be seen that phase adjustment is readily attainable by altering the value of the inductor 35 or the phasing capacitor 27 of the parallel-resonant circuit 29. Also, amplitude adjustment of the raster corrections potentials is easily obtained by proper selection of the series connected resistor 37 or the amplitude of the pulse potential at the horizontal frequency $fh$ appearing from the first portion 21 of the winding 17.

At this point it should be noted that pincushion correction at the opposite end or bottom of the scanning raster functions in a manner similar to the above-described top pincushion correction. However, the pulse signals available at the second portion 23 of the winding 17 and the polarity of the diode 39 are reversed with respect to the above-described operation. Thus, the signals are switched into the parallel resonant circuit 29 as the potential across the deflection yoke 25 swings positive with respect to the baseline of the pulse signals "B".

It should also be noted that there is an "overlap" "E" of the correction signal past the zero yoke voltage level when each half of the circuit is analyzed individually. However, when both halves of circuitry are functioning in a correct manner, the undesired "overlap" "E" is in essence cancelled because of the substantially equal and opposite magnitude and phase relationship.

Should it be necessary or desirable to eliminate rather than cancel the above-mentioned "overlap" "E", the baselines of the pulse signals "B" available from the first and second portions 21 and 23 of the flyback winding 17 must be referenced such that the diodes, 31 and 39 respectively, do not conduct until the voltage across the deflection winding 25 is substantially zero. One such form of circuitry is illustrated in FIG. 3 wherein the diode clamps, 51 and 53, are employed to clamp the baseline of the pulse signals "B" available from the first and second portions 21 and 23 of the winding 17 to the low side of the deflection winding 25.

Additionally, the capacitors 33 and 41 of FIG. 1, shunting the diodes 31 and 39 respectively serve to prevent undesired high frequency radiation due to transients developed during switching of the diodes 31 and 39. Obviously, such radiation is most unwanted in a television receiver employing an antenna and R.F. stages.

Thus, there has been provided unique top and bottom pincushion correction circuitry suitable for use in a television receiver. The circuitry is relatively simple and free from expensive components, thereby reducing the probabilities of catastrophic failure. Also, the circuitry provides individualized top and bottom correction without development of undesired electric and magnetic field radiation deleterious to the operation of a signal receiver.

While there has been shown and described what is at present considered the preferred embodiments of the invention, it will be obvious to those skilled in the art that various changes and modifications may be made therein without departing from the invention as defined by the appended claims.

What is claimed is:

1. In display apparatus employing a cathode ray tube, a top-bottom pincushion correction circuit comprising:
   a source of drive signals having a frequency $fv$;
   a deflection winding directly coupled to said source of drive signals at a frequency $fv$ for effecting unidirectional deflection of said electron beam of said cathode ray tube;
   a phasing capacitor shunting said deflection winding;
   a source of signals at a frequency $fh$, said source including a transformer winding having first and second portions with a center tap connected to one end of said deflection winding; and
   circuit means including oppositely-poled switching means directly coupling each one of said first and second portions of said transformer winding to the opposite end of said deflection winding to provide a circuit parallel resonant at a frequency $fh$.

2. The top-bottom pincushion correction circuit of claim 1 including a quadrupole convergence winding and associated convergence circuitry connecting said tap of said transformer winding to said deflection winding.

3. The top-bottom pincushion correction circuit of claim 1 wherein said circuit means includes an impedance in series connection with each of said first and second portions of said transformer winding and one of said oppositely-poled switching means.

4. The top-bottom pincushion correction circuit of claim 1 wherein said circuit means includes a reactance in series connection with each of said first and second portions of said transformer winding and one of said oppositely-poled switching means.

5. The top-bottom pincushion correction circuit of claim 1 wherein said circuit means includes a capacitor shunting each one of said oppositely-poled switching means whereby high frequency radiation due to switching transients is inhibited.

6. The top-bottom pincushion correction circuit of claim 1 including a diode clamping means coupled to each one of said oppositely-poled switching means circuit and to said tap of said transformer winding.

7. The top-bottom pincushion correction circuit of claim 1 including a potentiometer having opposite ends coupled to each one of said oppositely-poled switching means circuits and an adjustable arm coupled to said deflection winding.

8. In a television receiver, top and bottom pincushion correction circuitry comprising:
   a vertical deflection winding shunted by a phasing capacitor and associated with a cathode ray tube;
   a drive source directly coupled to said vertical deflection winding and providing a drive signal at a vertical scan frequency $fv$;
   a signal source in the form of a center tapped transformer winding having first and second portions and providing oppositelypoled signals at a frequency $fh$, said transformer tap being coupled to one end of said deflection winding; and
   circuit means including first and second oppositely-poled switching means coupled to first and second portions respectively of said transformer winding and directly coupled to the other end of said deflection winding whereby conductivity of one of said switching means provides a circuit parallel coupled to said deflection winding end resonant at a frequency $fh$.

9. The top and bottom pincushion correction circuit of claim 8 wherein said circuit means includes an adjustable impedance in series connection with each one of said oppositely-poled switching means.

10. The top and bottom pincushion correction circuit of claim 8 wherein said circuit means includes an adjustable reactance in series connection with each one of said oppositely-poled switching means.

11. The top and bottom pincushion correction circuit of claim 8 wherein said circuit means includes an impedance and inductance in series connection and a capacitor in shunt connection with each of said oppositely-poled switching means.

12. The top and bottom pincushion correction circuit of claim 8 including a quadrupole convergence winding and associated convergence circuitry coupling said transformer tap to said deflection winding.

13. The top and bottom pincushion correction circuit of claim 8 including a clamping means coupling each one of said first and second portions of said tap of said transformer winding.

14. The top and bottom pincushion correction circuit of claim 8 including a potentiometer having opposite ends connected to each one of said oppositely poled switching means circuits and an adjustable arm coupled to said deflection winding.

* * * * *

UNITED STATES PATENT OFFICE
CERTIFICATE OF CORRECTION

PATENT NO. : 3,949,269
DATED : April 6, 1976
INVENTOR(S) : Robert Charles Wheeler It is certified that error appears in the above-identified patent and that said Letters Patent are hereby corrected as shown below:

Col. 5, line 22 - Please delete "of circuitry" and insert -- of the circuitry --.

Col. 7, line 2 - Please delete "each of said" and insert -- each one of said --.

Col. 8, line 1 - Please delete "of said tap" and insert -- to said tap --.

Signed and Sealed this

Thirteenth Day of July 1976

[SEAL]

Attest:

RUTH C. MASON
Attesting Officer

C. MARSHALL DANN
Commissioner of Patents and Trademarks